Patented July 9, 1946

UNITED STATES PATENT OFFICE 2,403,439

PROCESS FOR ISOMERIZING MONO-OLEFINS

Vladimir N. Ipatieff and George S. Monroe, Riverside, Ill., assignors to Universal Oil Products Company, Chicago, Ill., a corporation of Delaware No Drawing. Application August 19, 1943, Serial No. 499,252

8 Claims. (Cl. 260—683.2)

The present invention relates to the conversion of hydrocarbons and is more particularly directed to the shifting of the position of the double bond in an olefinic hydrocarbon by catalytic means.

In view of the recent developments in the petroleum industry, particularly in the manufacture of aviation gasolines and synthetic rubber, methods for shifting the position of the double bond in olefinic hydrocarbons have become increasingly important. It has been found that alkymers produced by alkylation of normal butene-2 possess more desirable antiknock properties than those produced by alkylation of the isomer normal butene-1. In the manufacture of synthetic rubber, the length of the chain in the high molecular weight polymers produced by polymerization of such compounds as isobutene with butadiene or styrene depends in a large measure on the purity of the reactants and controls to a certain extent the physical and chemical properties of the resultant rubber. It is, therefore, essential in the manufacture of these synthetic rubbers that the reactants be of a high degree of purity. Similarly, the catalytic dehydrogenation of butenes into butadiene, one of the principal reactants in rubber manufacture, is performed more readily with less carbon formation and greater butadiene yields when the dehydrogenation charge is substantially free from isobutene. The present invention provides a method of separating the $C_4$ hydrocarbons to produce products of sufficient purity that they may be satisfactorily employed in synthetic rubber manufacture and in the production of butadiene.

It is well known that a $C_4$ hydrocarbon fraction cannot be separated into the individual $C_4$ hydrocarbons by simple fractional distillation since the boiling points of the various hydrocarbons are somewhat similar. This is particularly true with a mixture of $C_4$ olefins containing isobutene and normal butene-1, or a mixture containing these olefins and $C_4$ paraffins. The following table gives the boiling points of the various $C_4$ hydrocarbons at one atmosphere pressure.

*Boiling points at 1 atmosphere pressure*

| | °C. |
|---|---|
| Isobutane | −11.8 |
| Isobutene | −6.6 |
| Normal butene-1 | −6.4 |
| Normal butane | −0.5 |
| Normal butene-2 trans | +1 |
| Normal butene-2 cis | +3.7 |

It is apparent from the above table that the separation of the individual hydrocarbons, more particularly isobutene from normal butene-1, would be practically impossible by fractionation. However, it is also evident that if the butene-1 can be converted to butene-2, the separation can be accomplished with comparative ease.

Various catalytic materials have been proposed for the isomerization of olefins such as silica gel, alumina, bauxites, aluminum sulfate, concentrated solutions of zinc chloride, benzene sulfonic acid and so forth. However, these catalysts also tend to promote undesirable side reactions such as polymerization to produce high boiling polymers regardless of the operating conditions employed in the reaction.

It is an object of this invention to present a method for selectively utilizing the shifting of the double bond within an olefin hydrocarbon without substantial polymerization of the olefin to higher boiling hydrocarbons.

It is another object of this invention to provide a method of shifting the position of the double bond of olefinic hydrocarbons without changing the structural arrangement of the carbon atoms in the hydrocarbon molecules.

We have discovered a select group of catalysts which may be employed over a wide range of operating conditions to accomplish the objects mentioned.

In one broad aspect, the present invention consists of a process for shifting the position of the double bond in an olefinic hydrocarbon which comprises subjecting said olefinic hydrocarbon to contact under olefin isomerizing conditions with a catalyst comprising a dilute aqueous solution of a strong non-oxidizing acid.

We have found that the double bond contained in olefin hydrocarbons such as butene-1, pentene-1, 2,3-dimethyl butene-1, and the like can be shifted by the influence of catalyst materials comprising dilute aqueous solutions of strong non-oxidizing acids such as hydrogen chloride, hydrogen bromide or dilute acidic solutions of easily hydrolyzed salts of such acids such as ammonium chloride, iron chloride, nickel chloride, manganese chloride, magnesium chloride and the corresponding bromides, and the like.

The operation may be conducted over wide ranges of temperature and pressure depending primarily upon the hydrocarbon being isomerized and the catalyst employed. Generally speaking, temperatures within the range of about 25 to 400° C., preferably 150 to 300° C., and pressures of subatmospheric, atmospheric or substantially superatmospheric pressure may be satisfactorily employed. To maintain the selectivity of the reaction, the catalyst concentration in the aqueous solution must be carefully controlled. The solution should be mildly acidic, preferably at a pH of about 3 or more. The exact pH of the catalyst solution is dependent upon the charge and operating conditions used and is best determined by small scale experimental tests.

Various methods of operating may be employed. For example, the vapors of the charging stock may be bubbled upwardly through stationary pools of dilute aqueous solutions of the catalyst or by similarly passing the vapors upwardly countercurrent to the descending catalyst solution in vertical reactors containing filling or spacing materials such as, for example, granular fragments of relatively inert materials such as silica, alumina, firebrick and the like, or regularly spaced pans and trays may be employed to insure good contact between the charge and catalyst solutions.

Alternatively the reaction may be conducted by passing the olefins either alone or in admixture with other hydrocarbons in substantially liquid phase and a proportioned amount of a catalyst solution through tubular elements under conditions of turbulent flow, the products from the tubular elements being passed into separating chambers from which the hydrocarbon products are passed to a fractionator and the separated catalyst solutions returned for further service. The separated catalyst solution may be adjusted to the proper pH by the addition of fresh acid or salts prior to recycling to the tubular elements.

Still another method of conducting the reactions consists of introducing the charge and catalyst solution into a rotating vessel or a vessel provided with some means of obtaining rapid mixing of the hydrocarbon and catalyst such as, for example, a Stratford contactor or turbo mixer, passing the effluent from the vessel into a separation zone wherein hydrocarbons are separated from the catalyst solution and recycling catalyst solution containing the proper amount of acid or salt to the reaction vessel. The hydrocarbon products are then fractionaly distilled to separate the converted from the unconverted hydrocarbons which later may be recycled to the reaction zone.

This invention is applicable not only to a single olefin hydrocarbon or mixtures of olefinic hydrocarbons but also to mixtures of one or more olefins with saturated hydrocarbons such as, for example, the fractions obtained from the catalytic and thermal cracking of heavier hydrocarbon oils. It is particularly applicable to the $C_4$ fractions of the aforesaid source and permits the conversion of butene-1 to butene-2 in the presence of isobutene without substantial conversion of the isobutene to normal butenes or polymers.

It is, of course, evident that if the invention is employed to separate $C_4$ hydrocarbon fractions to recover isobutene without contamination by butene-1 or to recover a maximum of butene-2, the butene-2 originally present in the fraction should be removed by fractional distillation prior to the desired isomerization operation.

Since the isomerization reaction is an equilibrium reaction, this preliminary separation will aid in the subsequent isomerization operation. The butene-2 ordinarily present in the charge would tend to decrease the rate of reaction, and its removal prior to the isomerization will permit higher once through yields of butene-2 in the products.

The reaction may be conducted in a series of isomerization zones with intermediate separation of the isomerized product to effect a substantially complete conversion of the olefin to the desired isomer.

The following examples are introduced as illustrative of the results obtainable in the practice of the present process in the isomerization of butene-1 to butene-2 and isomerization of 2,3-dimethyl butene-1 to 2,3-dimethyl butene-2, but it is not intended that the scope of the invention should be limited in exact accordance with the data presented.

EXAMPLE I

In run No. 1 shown in Table I given below, weighed amounts of normal butene-1, water and ammonium chloride were placed in a steel rotating autoclave containing a glass liner. The reaction was conducted under the conditions shown in Table I given below and the products were removed from the autoclave and analyzed.

Run No. 2 shown in Table I is a comparative test in which similar quantities of butene-1 and water were charged to the rotating autoclave. This run was made to determine whether the water present in the autoclave had any isomerizing activity. It is evident from the data presented in Table I that the sole catalytic effect was due to the presence of the ammonium chloride in the reaction vessel.

TABLE I

*Isomerization of butene-1 to butene-2 with dilute aqueous ammonium chloride solution*

|  | Charge: ← Normal butene-1 → | |
|---|---|---|
|  | Run No. 1 | Run No. 2 |
| Operating conditions: |  |  |
| Time at operating temp., hours | 3 | 3 |
| Temp., °C | 230 | 230 |
| Pressure, atmospheres | 88–95 | 88–122 |
| Charge: Weight per cent: |  |  |
| n-Butene-1 | 37.3 | 36.6 |
| Water | 61.5 | 63.4 |
| $NH_4Cl$ | 1.2 |  |
| Total | 100.0 | 100.0 |
| Products, wt. per cent of butene-1 charged: |  |  |
| Butene-2 | 44.2 | 1.7 |
| Butene-1, recovered | 37.6 | 95.2 |
| $C_5$+hydrocarbons | 1.0 | 0.7 |
| Polymer | 0.0 | 0.0 |
| $C_4$ alcohols | 5.3 | 0.0 |
| Loss+uncondensable gas | 11.9 | 2.4 |
| Total | 100.0 | 100.0 |

EXAMPLE II

In Example II, results of which are shown in Table II given below, weighed amounts of 2,3-dimethyl butene-1, water and ammonium chloride were placed in a rotating autoclave similar to that used in Example I. Two tests were conducted, run No. 3 at 275° C. and run No. 4 at 230° C. An analysis of the products indicated that at least 50% of the 2,3-dimethyl butene-1 was isomerized to 2,3-dimethyl butene-2 with very little polymerization, the extent of polymerization being of the order of about 3%.

TABLE II

*Isomerization of 2,3-dimethyl butene-1 to 2,3-dimethyl butene-2 with dilute aqueous ammonium chloride solution*

|  | Charging stock: 2,3-dimethyl butene-1 | |
|---|---|---|
|  | Run No. 3 | Run No. 4 |
| Operating conditions: |  |  |
| Time at operating conditions | 3 | 3 |
| Temp., °C | 275 | 230 |
| Pressure, atmospheres | 109-143 | 95-105 |
| Charge: Weight per cent: |  |  |
| 2,3-dimethyl butene-1 | 47.2 | 44.2 |
| Water | 51.8 | 54.7 |
| NH$_4$Cl | 1.0 | 1.1 |
| Total | 100.0 | 100.0 |
| Products, wt. per cent of 2,3-dimethyl butene-1: |  |  |
| 2,3-dimethyl butene-2 | 50.0 | 62.7 |
| 2,3-dimethyl butene-1 (recovered) | 33.6 | 32.4 |
| Polymer | 3.3 | 3.6 |
| C$_6$ alcohols |  |  |
| Loss+uncondensable gas | 13.1 | 1.3 |
| Total | 100.0 | 100.0 |

The above examples indicate in a general way the selectivity of the catalysts disclosed in this invention as to their influence on the shifting of the position of the double bond of an olefinic hydrocarbon, since high yields of isomeric olefin hydrocarbons are obtained with very little polymerization of the olefinic hydrocarbons.

We claim as our invention:

1. A process for isomerizing butene-1 to butuene-2 which comprises contacting normal butene-1 under isomerization conditions with a catalyst comprising a dilute aqueous solution of ammonium chloride having a pH above about 3 but less than 7.

2. A process for isomerizing 2,3-dimethyl butene-1 to 2,3-dimethyl butene-2 which comprises contacting 2,3-dimethyl butene-1 under isomerization conditions with a catalyst comprising a dilute aqueous solution of ammonium chloride having a pH above about 3 but less than 7.

3. A process for shifting the position of the double bond in a mono-olefinic hydrocarbon which comprises contacting said mono-olefinic hydrocarbon at olefin isomerizing conditions with a catalyst comprising an aqueous solution of an acid selected from the group consisting of hydrogen chloride and hydrogen bromide, said aqueous solution having a pH above about 3 but less than 7.

4. An isomerization process which comprises converting a normal alpha olefin into the corresponding normal beta olefin by contacting said alpha olefin at olefin isomerizing conditions with a catalyst comprising an aqueous solution of an acid selected from the group consisting of hydrogen chloride and hydrogen bromide and maintaining the pH of said solution above about 3 but below 7 to substantially avoid polymerization.

5. The process of claim 3 further characterized in that said aqueous solution is formed by dissolving in water a hydrolyzable salt of said acid.

6. The process of claim 3 wherein said mono-olefinic hydrocarbon comprises butene-1.

7. The process of claim 3 wherein said mono-olefinic hydrocarbon comprises 2,3-dimethyl butene-1.

8. The process of claim 3 wherein said mono-olefinic hydrocarbon comprises pentene-1.

VLADIMIR N. IPATIEFF.
GEORGE S. MONROE.